(12) United States Patent
Williams

(10) Patent No.: US 6,876,095 B2
(45) Date of Patent: Apr. 5, 2005

(54) GENERATOR APPARATUS

(76) Inventor: Gregory M. Williams, 700 S. Ocean Blvd., Apt. 602, Boca Raton, FL (US) 33432

( * ) Notice: Subject to any disclaimer, the term of this patent is extended or adjusted under 35 U.S.C. 154(b) by 143 days.

(21) Appl. No.: 10/456,453

(22) Filed: Jun. 7, 2003

(65) Prior Publication Data

US 2004/0245781 A1 Dec. 9, 2004

(51) Int. Cl.⁷ ............................................... H02P 9/04
(52) U.S. Cl. ..................................... 290/1 R; 290/1 A
(58) Field of Search .................................. 290/1 R, 45

(56) References Cited

U.S. PATENT DOCUMENTS

| | | | | |
|---|---|---|---|---|
| 4,352,023 A | * | 9/1982 | Sachs et al. ................... | 290/42 |
| 4,387,513 A | * | 6/1983 | Cowdin ......................... | 33/322 |
| 4,415,813 A | * | 11/1983 | Carme .......................... | 290/44 |
| 5,440,945 A | * | 8/1995 | Penn ............................ | 74/117 |
| 5,451,134 A | * | 9/1995 | Bryfogle ..................... | 414/680 |
| 5,838,121 A | * | 11/1998 | Fairbairn et al. ............. | 318/45 |

\* cited by examiner

Primary Examiner—Nicholas Ponomarenko
(74) Attorney, Agent, or Firm—Robert M. Downey PA

(57) ABSTRACT

A generator apparatus has a main shaft with an electric generator motor in driven connection therewith. A weight element is coupled to an end of the shaft and is supported radially outward of the longitudinal axis of the shaft. Leveraged movement of the end of the shaft in a cyclical motion imparts a tangential force on the weight element creating angular momentum which carries the weight element about a generally circular path relative to the longitudinal axis of the shaft, thereby rotating the shaft. The electric generator motor is driven by rotation of the shaft to produce electric power.

5 Claims, 3 Drawing Sheets

GENERATOR APPARATUS

BACKGROUND OF THE INVENTION

1. Field of the Invention

The present invention relates to generators and, more particularly, to a highly efficient apparatus for generating electricity wherein angular momentum of a weight element rotates a shaft to drive an electric generator motor.

2. Discussion of the Related Art

Generators of various types are well known in the art. A common and well known generator design converts mechanical energy into electric energy by electromagnetic induction. The mechanical energy may be derived from a combustion engine or another type of fuel burning prime mover. One drawback associated with known generator arrangements of this type is that the mechanical energy needed to drive the generator is greater than the electric energy output of the generator. This loss of efficiency is due to a number of external factors including friction and inefficient operation of the mechanical energy-producing source. Accordingly, there remains a need in the electric generator art for a more efficient means for converting mechanical energy into electric energy in the generation of electric power.

SUMMARY OF THE INVENTION

The present invention is directed to a generator apparatus which includes a main shaft in driven connection with an electric generator motor. A weight element coupled to an end of the shaft is supported radially outward of the longitudinal axis of the shaft to generate angular momentum upon movement of the end of the shaft in a cyclical motion. The angular momentum of the weight element carries the weight element about a generally circular path relative to the longitudinal axis of the shaft, thereby rotating the shaft and driving the electric generator motor to produce electric power.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figures 1, 2:
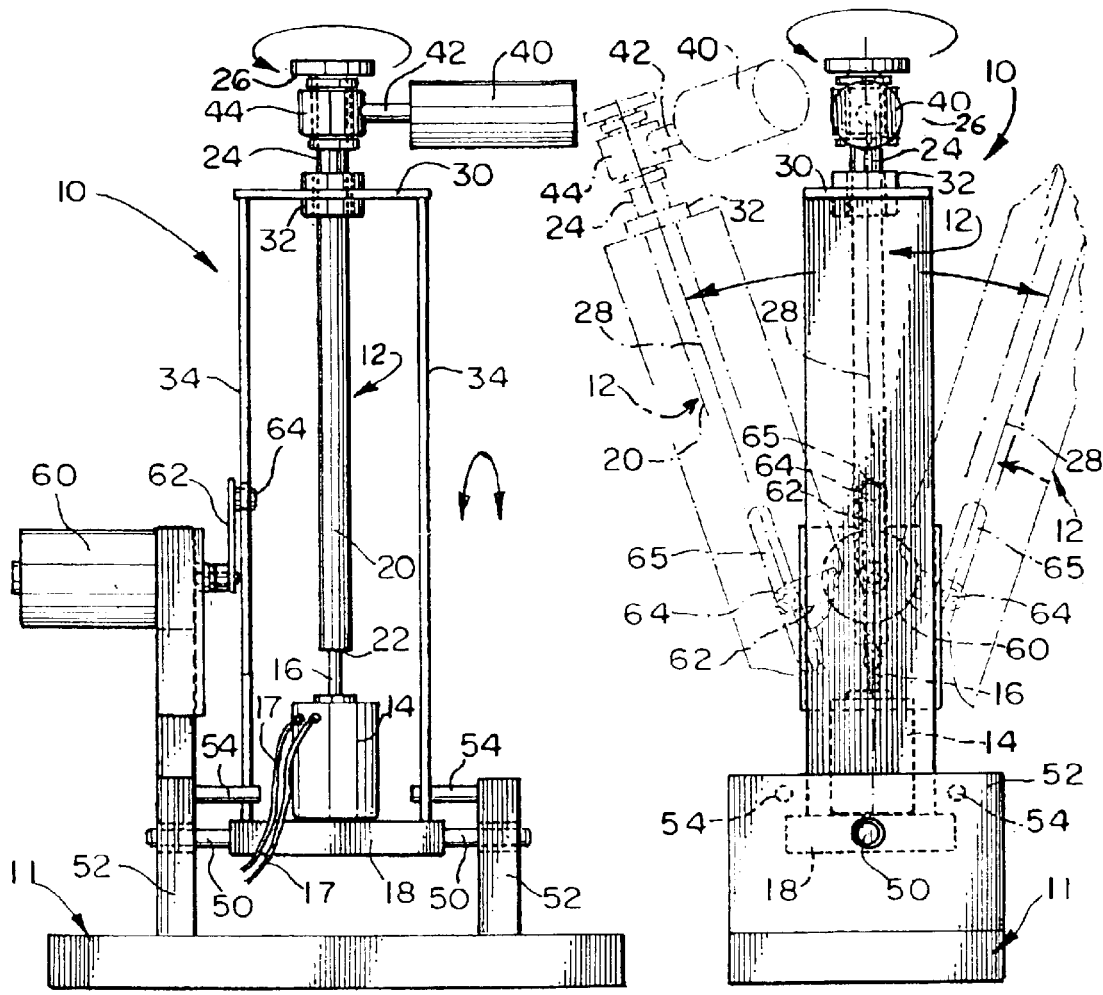
FIG. 1 is a front elevational view of the generator apparatus according to a first preferred embodiment thereof.
FIG. 2 is a side elevational view of the generator apparatus of FIG. 1 illustrating side-to-side rocking cyclical motion of a tower of the apparatus as shown by the phantom line images.
Figure 3:
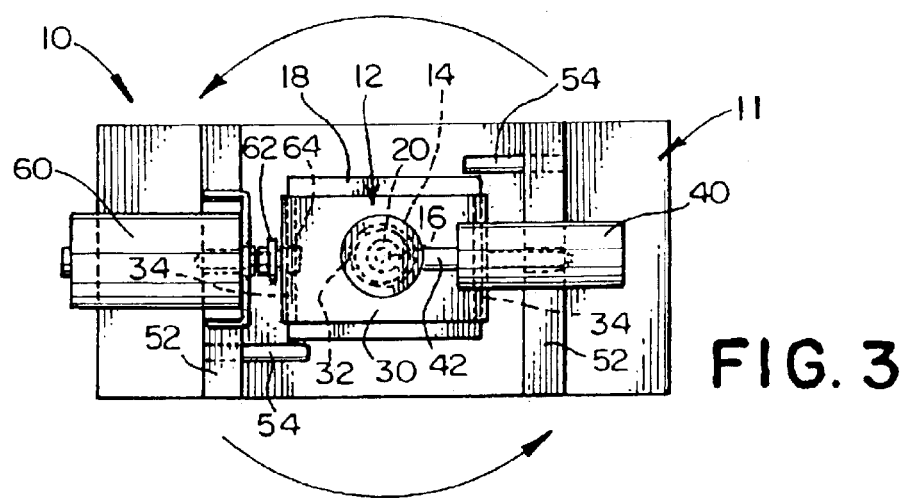
FIG. 3 is a top plan view of the generator apparatus of FIG. 1.

Referring to the several views of the drawings, and initially FIGS. 1–3, the generator apparatus of the present invention is shown and generally indicated as 10. The generator apparatus 10 includes a base 11 which supports a tower 12. A generator motor 14 is supported on the tower 12 and includes a rotor shaft 16 and output conductors 17. In the embodiment of FIGS. 1–3, the generator motor 14 is mounted on a support platform 18 at the base of the tower 12.

The tower 12 further includes a main shaft 20 having a lower end 22, and upper end zone 24 and an upper end 26. In the embodiment of FIGS. 1–3, the lower end 22 of the main shaft 20 connects to the rotor shaft 16 of the generator motor, in axial alignment therewith, so that the main shaft 20 and rotor shaft 16 are rotatable about a common central longitudinal axis 28.

A cross brace 30 supports the upper portion of the main shaft 20 to reduce stress at the lower end 22. A bearing 32 connects the cross brace 30 to the main shaft 20 and permits rotation of the main shaft relative to the cross brace 30. Vertical supports 34 extend upwardly from the base platform and connect to the cross brace 30 in order to anchor the cross brace and to provide structural stability so that the main shaft 20 does not flex or bend.

An arm member 42 extends from the upper end zone 24 of the main shaft 20 at the top of the tower 12 and connects to a weight element 40. A collar 44 couples the arm member 42 to the upper end zone 24 of the main shaft 20 so that the weight element 40, arm member 42 and shaft 20 are able to rotate as an integral unit about the longitudinal axis 28.

The tower 12 is pivotally supported on the base 11 in a manner which allows the tower to move in a side-to-side rocking motion. More specifically, an axle 50 extending from the opposite ends of the support platform 18 is supported within vertical walls 52 of the base and defines a pivot axis to permit side-to-side rocking movement of the tower 12 in a cyclical motion, as illustrated in FIG. 2. Stop members 54 limit movement of the tower 12 from the upright position, thereby defining a range of side-to-side rocking movements, as illustrated in FIG. 2. The stop members 54 prevent the tower 12 from falling beyond the range of vertical side-to-side rocking motion.

An external force is applied to the tower 12 to cause the tower to move in the side-to-side cyclical motion about the pivot axis defined by axle 50. In one embodiment, as seen in FIGS. 1–3, an electric motor or other external power source is mounted to the apparatus for exerting a mechanical force which is sufficient to rock the tower 12 in the side-to-side cyclical rocking motion. In this embodiment, a lever 62 may be connected between the output shaft of the motor 60 and a sliding attachment 64 on the side of the tower. Operation of the motor 60 serves to rotate the lever 62 while the sliding attachment 64 moves back and forth in a reciprocating action within a channel 65, thereby exerting a force in one direction as the sliding attachment 64 moves downwardly in the channel 65 and in an opposite direction as the lever continues to rotate and the sliding attachment 64 moves upwardly within the channel 65, thereby urging the tower 12 from one side to the other of the vertical upright position and causing the tower 12 to rock back and forth, as illustrated in FIG. 2.

Movement of the tower 12 in the side-to-side cyclical motion causes the upper end zone 24 of the shaft 20 to move back and forth through an arc of cyclical motion. Movement of the upper end zone 24 of the shaft 20 in this motion imparts a tangential force on the weight element, which is supported outwardly of the longitudinal axis 28 of the shaft 20. This results in angular momentum of the weight element 40 to carry the weight element about a generally circular path having a radius defined by the distance between the weight element and the longitudinal axis 28 of the shaft 20, as determined by the length of the interconnecting arm member 42. As the weight element 40 moves about the circular path, the shaft 20 is rotated. Rotation of the shaft 20 drives rotation of the interconnecting rotor shaft 16 of the generator motor 14, thereby operating the generator motor to produce electric power. The produced electric power is output through the conductors 17 for external use.

Figure 6:
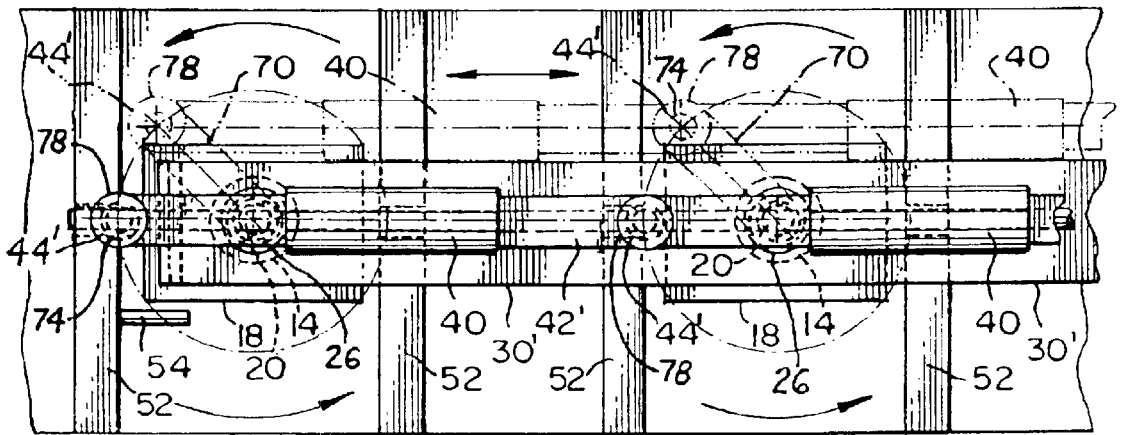
FIG. 6 is a partial top plan view taken from the arrow 6—6 in FIG. 5.
Figure 5:
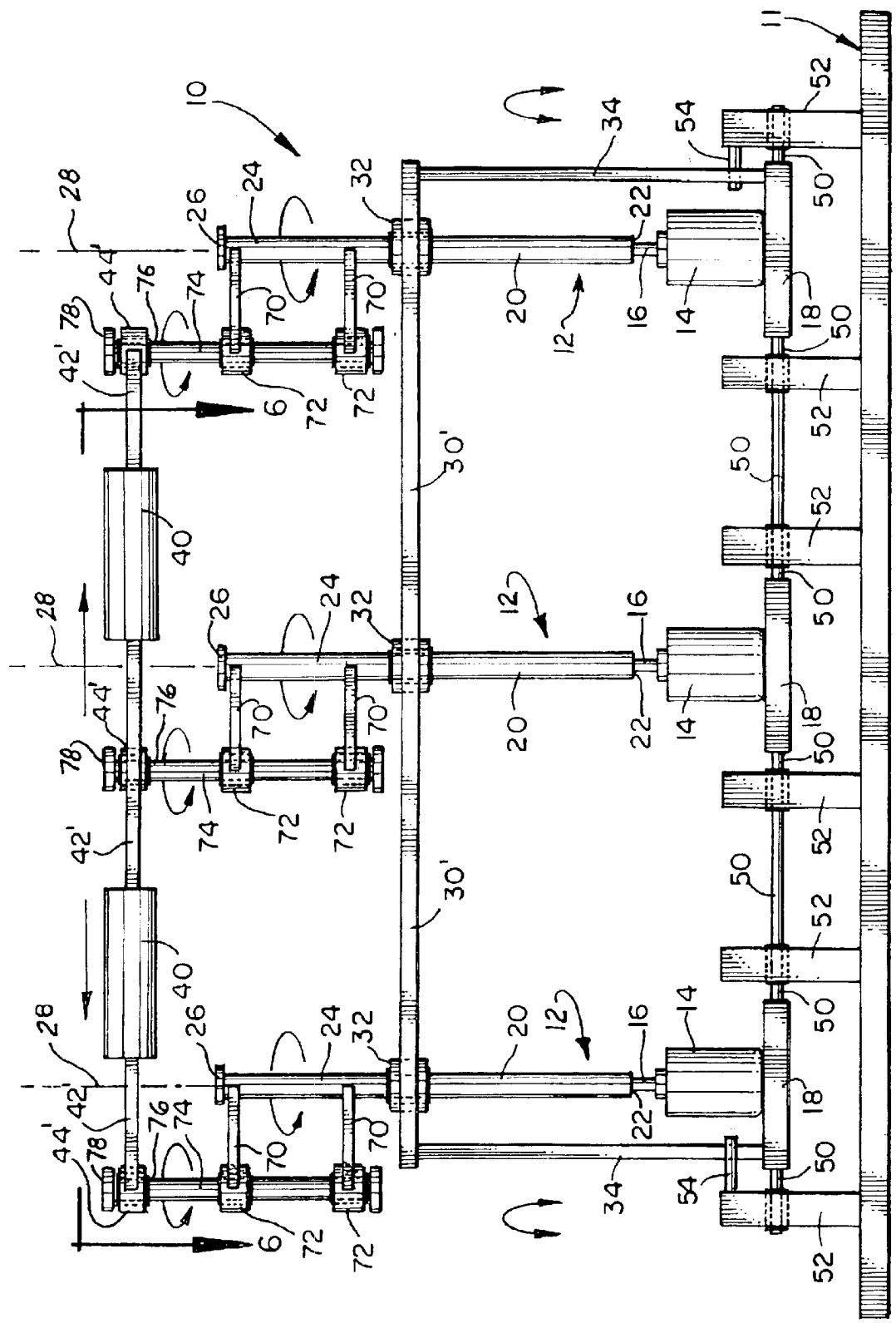
FIG. 5 is a front elevational view illustrating yet a further embodiment of the generator apparatus wherein multiple towers of the type shown in the embodiment of FIG. 1 are linked together to increase the power-generating capacity of the apparatus.

Referring now to FIGS. 5 and 6, a further adaptation of the apparatus 10 of FIGS. 1–3 is shown, wherein multiple towers 12 are supported on the base 11 and interconnected by a common cross brace 30'. Similar to the embodiment of FIGS. 1–3, the cross brace 30' connects to the mid zone of the shafts 20 with the use of bearings 32 which allow the shafts 20 to rotate relative to the cross brace 30'. The embodiment of FIGS. 5 and 6 further provides arms 70 which extend from the upper end zones 24 of the shafts 20 for interconnection to secondary shafts 74 with the use of bearings 72. The bearings 72 are structured and disposed to permit rotation of the secondary shafts 74 relative to the main shafts 20. The secondary shafts 74 each include an upper end zone 76 which terminates at an upper distal end 78. The upper end zones 76 of each of the respective secondary shafts 74 are connected with a common arm member 42' which links the upper end zones 76 with the use of bearings 44'. The bearings 44' allow the secondary shafts 74 to rotate relative to the interconnecting arm member 42'. The arm member 42' serves to link the multiple towers 12 in a manner which permits synchronized rotation of the multiple main shafts 20. One or more weight elements 40 are supported on the interconnecting arm member 42'. Similar to the embodiment of FIGS. 1–3, the weight element(s) 40 is maintained outboard of the central longitudinal axis 28 of each of the shafts 20 so that rocking movement of the towers and cyclical motion of the upper end zones of the shafts 20 and secondary shafts 74 results in synchronized rotation of the weight elements and secondary shafts 74, which drives synchronized rotation of the plurality of main shafts 20 and rotor shafts 16 of the generator motors 14. Use of multiple towers, in this manner, provides for a greater electric power generation output capacity.

Figure 4:
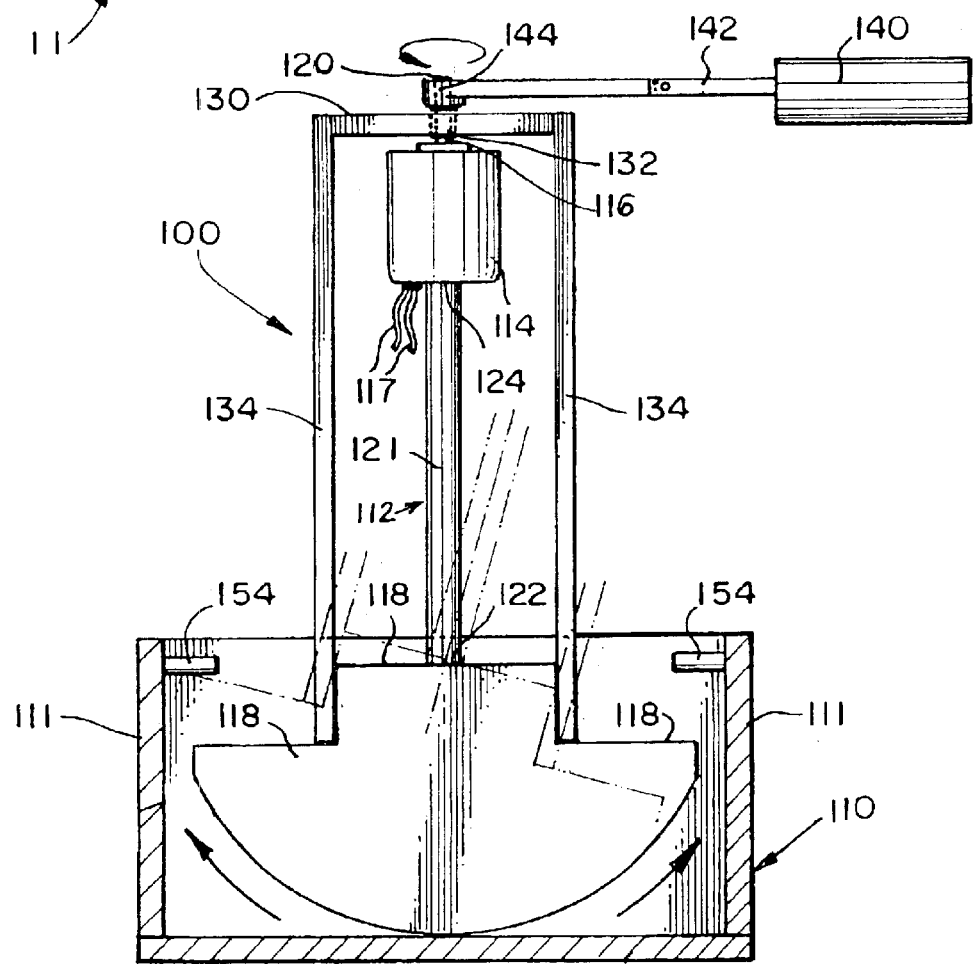
FIG. 4 is a front elevational view, in partial cross-section, illustrating the generator apparatus according to a second embodiment thereof.

Referring to FIG. 4, a further embodiment of the generator apparatus is shown and is generally indicated as 100. In this particular embodiment, the apparatus 100 includes a base 110 which is generally in the form of a box and includes side walls 111. A tower 112 includes a rocker base 118 which is maintained within the box base 110. The tower 112 extends upwardly from the rocker base 118 and above the box base 110. In this particular embodiment, the generator motor 114 is supported on the upper end 124 of support post 121. The lower end 122 of the support post 121 is mounted to the rocker base 118. Cross brace 130 spans across the upper end of the tower 112 and provides support for the main shaft 120 and rotor shaft 116 of the generator motor 114. A bearing 132 on the cross brace 130 supports the rotor shaft 116 and permits rotation of the rotor shaft 116 of the generator motor 114. Vertical supports 134 are fixed at the lower end to the rocker base 118 and extend up to interconnect with the cross brace 130. In this particular embodiment, the support post 121 is maintained fixed along with the vertical supports 134 and cross brace 130 of the tower 112.

Weight element 140 is supported outboard of the longitudinal axis of the main shaft 120 and rotor shaft 116. Specifically, the weight element 140 is supported on the end of the interconnecting arm member 142 which extends from the top free end of the main shaft 120 to the weight element 140. A collar 144 fixedly secures the arm member 142 to the main shaft 120 and/or rotor shaft 116 of the generator motor 114 so that the weight element 140, arm member 142 and collar 144 are rotatable as an integral unit with the main shaft 120 and rotor shaft 116.

The rocker base 118 is structured to permit rocking motion of the tower 112 in a side-to-side cyclical motion, similar to that of the embodiment of FIGS. 1–3, as described above. Stop members 154 are positioned on the inner sides of side walls 111 of the box base 110 for engaging the upper platform surface of the rocker base 118 in a manner which limits rocking motion of the rocker base 118 and tower 112, as illustrated by the phantom lines in FIG. 4. Similar to the embodiments described above, rocking motion of the tower 112 results in rotation of the weight element 140 about a circular path to thereby drive rotation of the rotor shaft 116. Driven rotation of the rotor shaft 116 results in operation of generator motor 114 to produce electric power which is output through conductors 117 for external use.

While the present invention has been shown and described in accordance with various preferred and practical embodiments thereof, it is recognized that departures from the instant disclosure are contemplated within the spirit and scope of the present invention which, therefore, should not be limited except as defined in the following claims as interpreted under the doctrine of equivalents.

What is claimed is:

1. A generator apparatus comprising:
   a main shaft extending along a longitudinal axis and including a first end zone and a second end zone;
   an electric generator connected to said main shaft and driven by rotation of said main shaft for generating electric power;
   said first end zone of said main shaft being moveably supported for allowing lateral movement of said longitudinal axis of said shaft in a manner which causes said second end zone to travel through a path of cyclical motion;
   a motor for moving said shaft in said lateral movement; and
   a weight element coupled to said second end of said shaft and supported radially outward of said longitudinal axis for generating angular momentum during said cyclical motion of said second end zone of said shaft, and said angular momentum of said weight element carrying said weight element about a circular path relative to said longitudinal axis to rotate said main shaft and drive said electric generator.

2. The generator apparatus as recited in claim 1 further comprising:
   a base;
   a support platform pivotally supported on said base and said support platform being structured and disposed to support said main shaft and said electric generator and said support platform being movable about said pivot axis to cause lateral movement of said longitudinal axis of said shaft.

3. The generator apparatus as recited in claim 2 further comprising:
   stop members for limiting movement of said support platform about said pivot axis.

4. The generator apparatus as recited in claim 3 further comprising:

supports members connected to said support platform and said main shaft.

5. The generator apparatus as recited in claim 1 further comprising:

a plurality of said main shafts;

a plurality of said electric generators, wherein each of said plurality of electric generators is connected to a respective one of said plurality of main shafts; and said weight element coupled to said second end of each of said plurality of said main shafts.

* * * * *